United States Patent
Yvon et al.

(10) Patent No.: US 7,725,846 B2
(45) Date of Patent: May 25, 2010

(54) CONVERSION OF A THREE-DIMENSIONAL WIRE HARNESS REPRESENTATIVE TO A TWO-DIMENSIONAL ORTHOGONAL WIRE HARNESS REPRESENTATIVE

(76) Inventors: Jean-Mark Yvon, Mentor House, Edward Court, Altrincham Businness Park (GB); Mark Colonnese, Mentor House, Edward Court, Altrincham Businness Park (GB); Steven Trythall, Mentor House, Edward Court, Altrincham Businness Park (GB)

( * ) Notice: Subject to any disclaimer, the term of this patent is extended or adjusted under 35 U.S.C. 154(b) by 174 days.

(21) Appl. No.: 11/818,110

(22) Filed: Jun. 12, 2007

(65) Prior Publication Data

US 2007/0255544 A1 Nov. 1, 2007

Related U.S. Application Data

(63) Continuation of application No. PCT/EP2006/069552, filed on Dec. 11, 2006.

(60) Provisional application No. 60/751,342, filed on Dec. 16, 2005.

(51) Int. Cl.
G06F 17/50 (2006.01)
(52) U.S. Cl. ............. 716/3; 716/1; 716/2; 716/12; 716/13; 716/14; 716/15; 703/13; 703/14
(58) Field of Classification Search .......... 716/1–3, 716/12–15; 703/1, 4, 13–14
See application file for complete search history.

(56) References Cited

U.S. PATENT DOCUMENTS

| | | | |
|---|---|---|---|
| 5,506,950 A | 4/1996 | Hughes et al. | |
| 6,330,746 B1 * | 12/2001 | Uchiyama et al. | 29/872 |
| 7,082,590 B2 * | 7/2006 | Kragh et al. | 716/13 |
| 7,200,537 B2 * | 4/2007 | Ozaki | 703/7 |
| 2003/0020715 A1 * | 1/2003 | Sakakura et al. | 345/424 |
| 2005/0091628 A1 | 4/2005 | Kragh et al. | |

FOREIGN PATENT DOCUMENTS

| | | |
|---|---|---|
| DE | 43 17 688 | 8/1994 |
| EP | 0 304 864 | 3/1989 |
| EP | 0 696 775 | 2/1996 |
| EP | 1 275 565 | 1/2003 |
| JP | 2002-231074 | * 8/2002 |

OTHER PUBLICATIONS

Written Opinion and International Search Report for PCT/EP2006/069552, filed Dec. 11, 2006.
Alibozek, Tim, "Smart software builds a better harness," *Machine Design*, vol. 70, No. 8, pp. 89-92 (May 7, 1998).

* cited by examiner

*Primary Examiner*—Thuan Do
*Assistant Examiner*—Nghia M Doan
(74) *Attorney, Agent, or Firm*—Klarquist Sparkman, LLP

(57) ABSTRACT

A method and system are described that allow conversion of a three-dimensional representation of a wire harness to a two-dimensional representation. In one aspect, the three-dimensional representation of the wire harness is converted to a two-dimensional orthogonal representation with branches in the wire harness arranged perpendicularly. In another aspect, when more than four branches enter a single node in the wire harness, one or more of the branches are placed within a predetermined angle to the perpendicular lines. The orthogonal representation allows simplified detection of disconnects in the wire harness that are otherwise difficult to visualize in three dimensions.

20 Claims, 12 Drawing Sheets

CONVERSION OF A THREE-DIMENSIONAL WIRE HARNESS REPRESENTATIVE TO A TWO-DIMENSIONAL ORTHOGONAL WIRE HARNESS REPRESENTATIVE

CROSS REFERENCE TO RELATED APPLICATION DATA

This application is a continuation of co-pending International Patent Application No. PCT/EP2006/069552, filed Dec. 11, 2006, which claims the benefit of U.S. Provisional Patent Application No. 60/751,342, filed Dec. 16, 2005, both of which are hereby incorporated by reference.

FIELD OF THE INVENTION

The present invention generally relates to the design of wire harnesses, and, more particularly, to an orthogonal view of a wire harness in two dimensions.

BACKGROUND

Wire harnesses include a bundle of insulated conductors bound together, for example, by helically wound tape to produce an arrangement that is compact and easy to manage. Wire harnesses may be used in a variety of applications to electrically interconnect components of a product. For example in an automobile, a harness may allow connections to the dash board, head lights, battery, tail lights, etc.

Design of a wire harness takes place in both three-dimensions and two-dimensions. A three-dimensional (3D) mechanical computer aided design (MCAD) system is used to hold the geometry definition of the harness. However, much of the actual design, engineering, pre-production, preparation of costs, and bills of material are all completed in a separate two-dimensional (2D), electrical computer aided design (ECAD) system. Typically, the geometric harness data may be exported from the 3D system to the 2D system, which engineers use to finish the design. For example, the 2D system has a component library and tools needed to solve logical (rather than geometrical) problems.

It is desirable to obtain 2D drawings of the system, which are used for a variety of purposes including creating a layout of an assembly board used to manufacture the wire harness. For this reason, MCAD systems generally include a "mechanical flattening" program for converting the 3D geometric harness data to 2D. Such flattening programs take into account mechanical constraints, such as the flexibility of the wires and torsional constraints, in producing the 2D image. However, these mechanical flattening programs are very slow and error prone.

Another option to obtain a 2D drawing is to export the 3D data to a 2D system and perform the flattening in the 2D system. Indeed, such systems exist, but only remove the Z component of the 3D data. The result is that there are many overlapping nodes and branches that hamper the visualization of the harness in 2D. Such overlaps may be manually adjusted, but this also is a slow process and does not provide ideal results.

Thus, it is desirable to produce a flattening system that generates a clean and esthetically pleasing view of a harness in 2D.

SUMMARY

A method and system are described that allow conversion of a three-dimensional representation of a wire harness to a two-dimensional representation.

In one aspect, the three-dimensional representation of the wire harness is automatically converted to a two-dimensional orthogonal representation with branches in the wire harness arranged perpendicularly.

In another aspect, when more than four branches enter a single node in the wire harness, one or more of the branches are placed at a predetermined angle to the perpendicular lines.

In still other aspects, the perpendicular lines are arranged starting with a backbone of the wire harness, which may be determined using a variety of techniques.

The orthogonal representation allows simplified detection of disconnects in the wire harness that are otherwise difficult to visualize in three dimensions.

These features and others of the described embodiments will be more readily apparent from the following detailed description, which proceeds with reference to the accompanying drawings.

DETAILED DESCRIPTION

Figure 1:
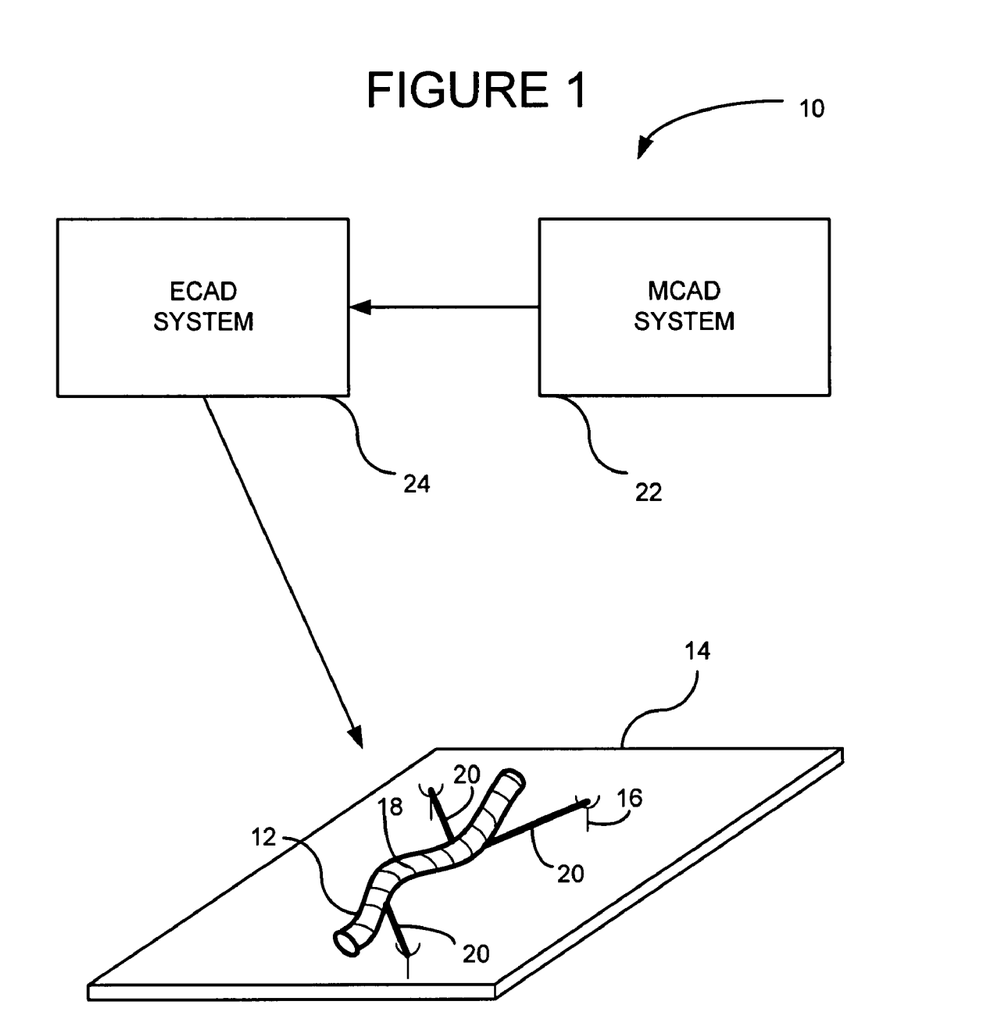
FIG. 1 is a system view showing a three-dimensional MCAD system and a two-dimensional ECAD system used to create a wire harness.

FIG. 1 shows a system 10 used to create a wire harness 12. The wire harness 12 is shown positioned on a typical assembly board 14 and held in place by supporting jigs 16 in accordance with two-dimensional drawings. The wire harness is formed by multiple branches including a backbone branch 18 and various sub-branches 20. The design of the wire harness occurs in both a three-dimensional MCAD system 22 and an ECAD system 24. The master data for the geometry definition of the harness is in three-dimensions in the MCAD system 22. However, to finish the detailing of the wire harness the 3D data is exported to the ECAD system 24 where further design, pre-production, preparing costs, a bill of materials, etc. are performed. It is within the ECAD system that a two-dimensional drawing is desirable in order to understand what the harness comprises and help build a design process around it. Additionally, the two-dimensional representation helps produce a full-scale representation of the layout of the board 14 on which the wire harness will be built.

Figure 2:
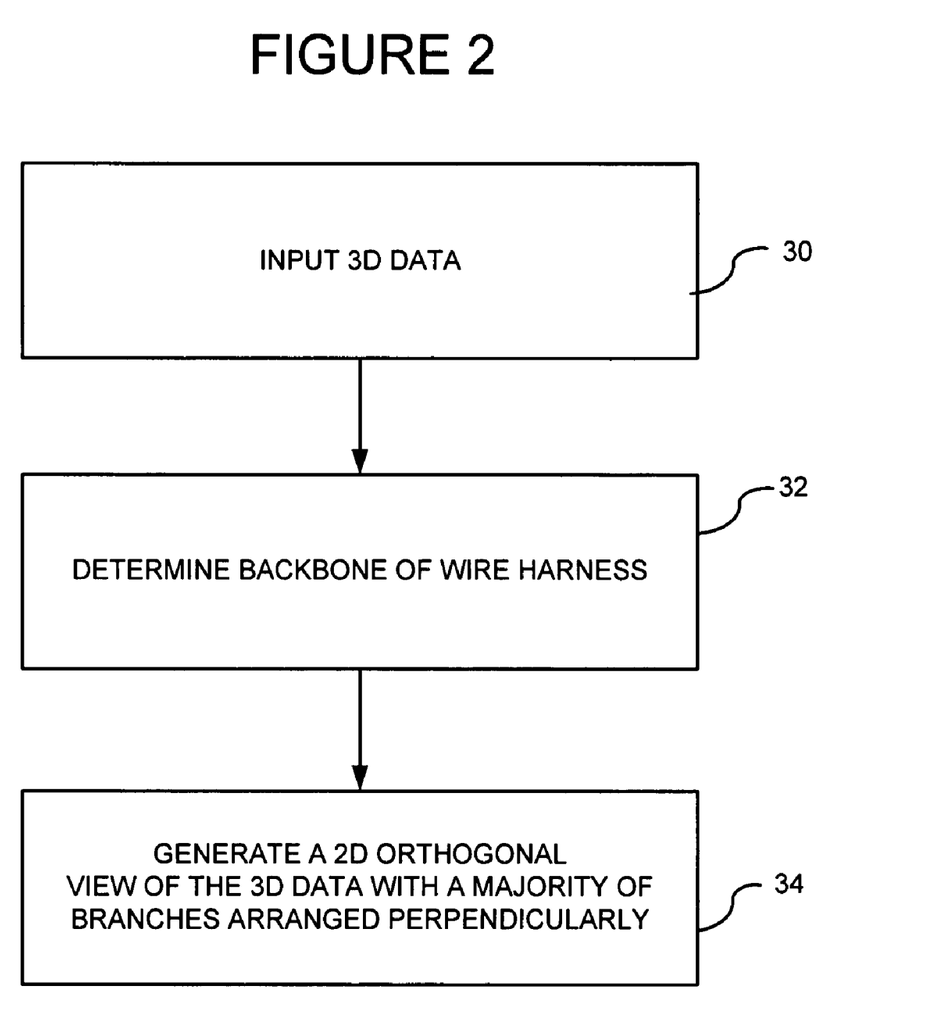
FIG. 2 shows a flowchart of a method for creating an orthogonal two-dimensional view of the wire harness.
Figure 8:
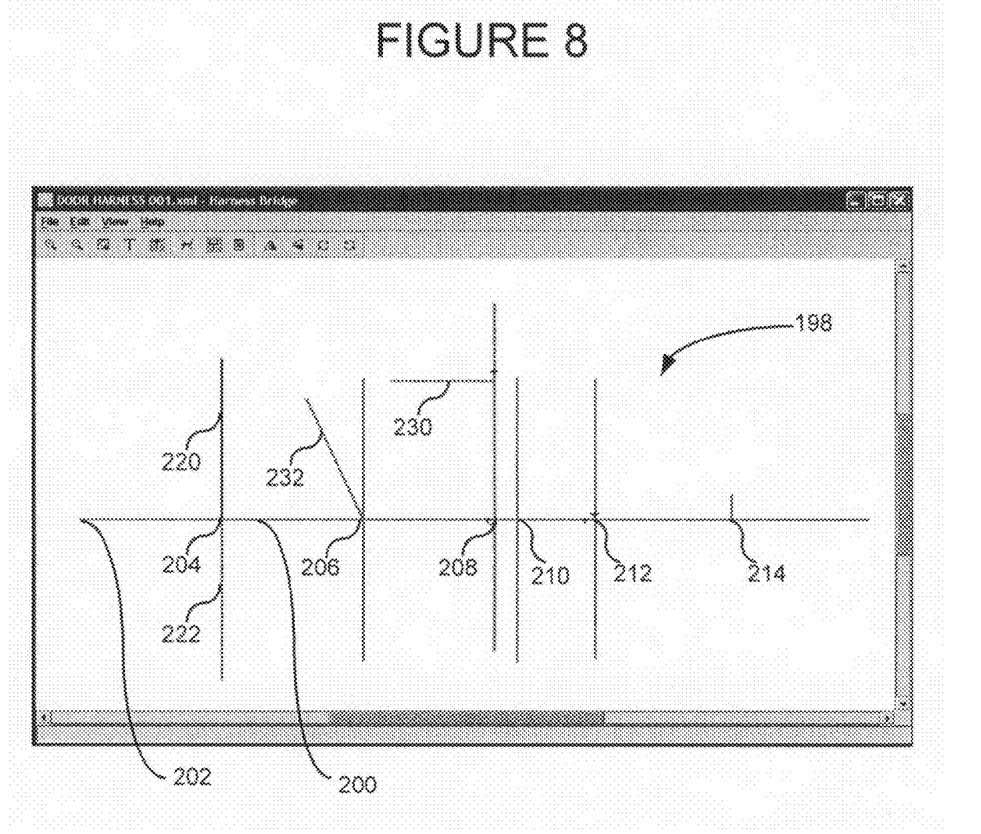
FIG. 8 is an example orthogonal view of a wire harness.

FIG. 2 shows a flowchart of a method for generating the two-dimensional orthogonal representation of the wire harness. In process box 30, the three-dimensional data is received, such as from MCAD system 22. In process block 32, the backbone of the system is determined. As further described below, the backbone is the starting point and is centrally located in the representation so that readability of the two-dimensional representation is maximized. A further description of the backbone determination is below in regards to FIGS. 3-6. In process block 34, the two-dimensional representation of the wire harness is automatically generated with a majority of the branches arranged perpendicularly. Such an orthogonal view is shown in FIG. 8 and is described in further detail below.

Figure 3:
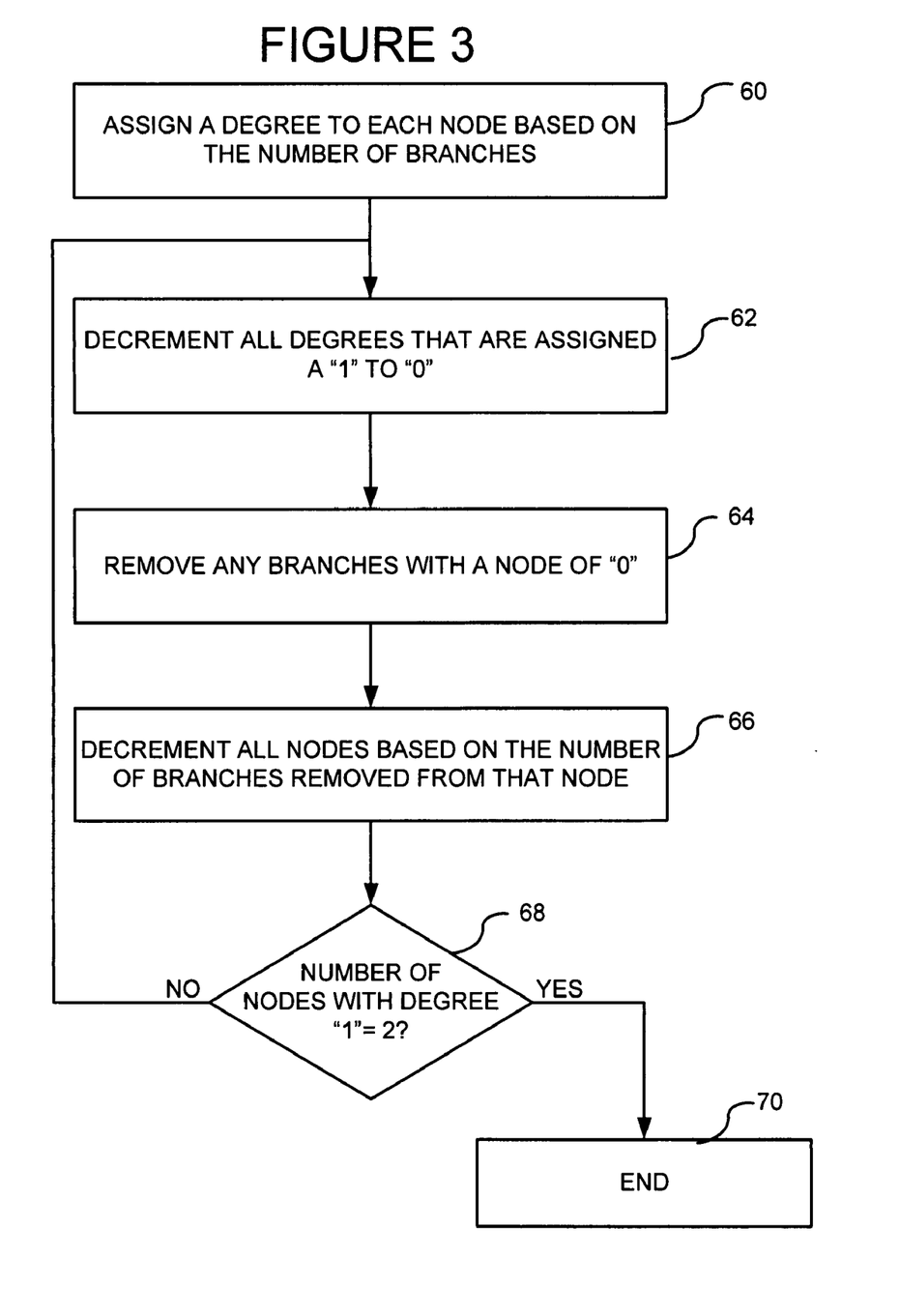
FIG. 3 is a flowchart of a method for finding a backbone of a wire harness.

FIG. 3 shows a flowchart of a method for determining the backbone of the wire harness. In process block 60, a degree (e.g., a number) is assigned to each node. The degree is representative of the number of branches connected to the node. In process block 62, all degrees that have a value of "1" are decremented to "0" and removed (process block 64). In process block 66, all degrees associated with the nodes are decremented an amount equal to the number of branches that were removed from that node. In process block 68, a check is made to determine whether there are two nodes that have a degree equal to "1". If so, the method ends at process block 70. If not, the process continues and is repeated starting with process block 62.

Figure 4:
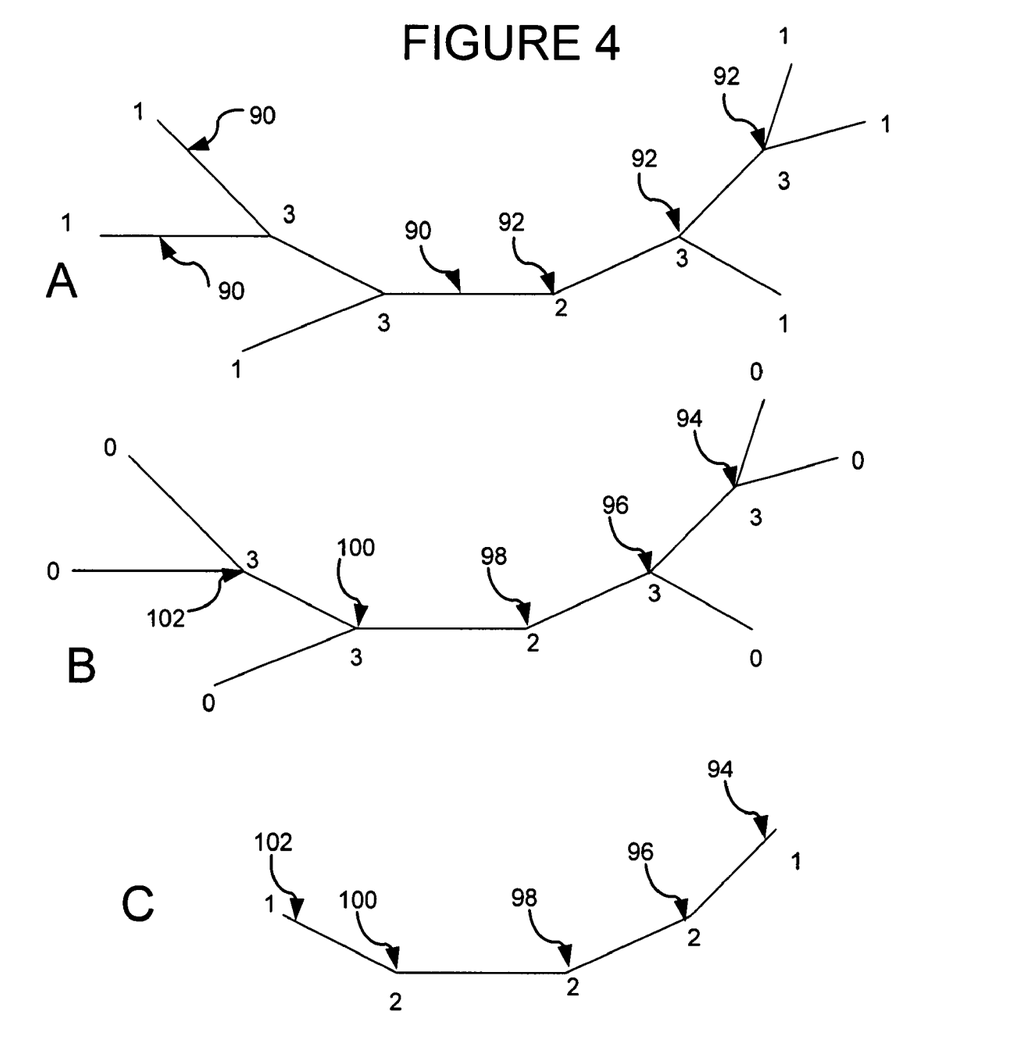
FIG. 4 is a particular example showing how the backbone is determined using the method of FIG. 3.

FIG. 4 is an example of backbone selection using the method of FIG. 3. The sequence of progression is illustrated by the letters "A", "B" and "C". The wire harness designated by the letter "A" is a pictorial view of 3D data supplied by the MCAD system and shows multiple branches, some of which are shown generically at 90. The branches are separated by nodes, some of which are shown generally at 92, and have a number associated therewith indicative of the number of branches entering the node. End nodes are designated with a "1". Process block 62 of FIG. 4 explains that all nodes with a degree "1" are reduced to degree "0". Thus, as shown at "B" in FIG. 4, the end nodes are reduced to "0". Corresponding to process block 64, all branches with a "0" are removed resulting in the final stage "C" in the progression. Additionally, corresponding to process block 66, the degree of each node is reduced according to the number of branches removed. Comparing B and C, node 94 had two branches removed. Thus, node 94 is reduced by 2; node 96 is reduced by 1; node 98 remains unchanged; node 100 is reduced by 1; and node 102 is reduced by 2. Once there are two nodes having a degree of "1", the method is finished and the result is the determined backbone of the wire harness.

Figure 5:
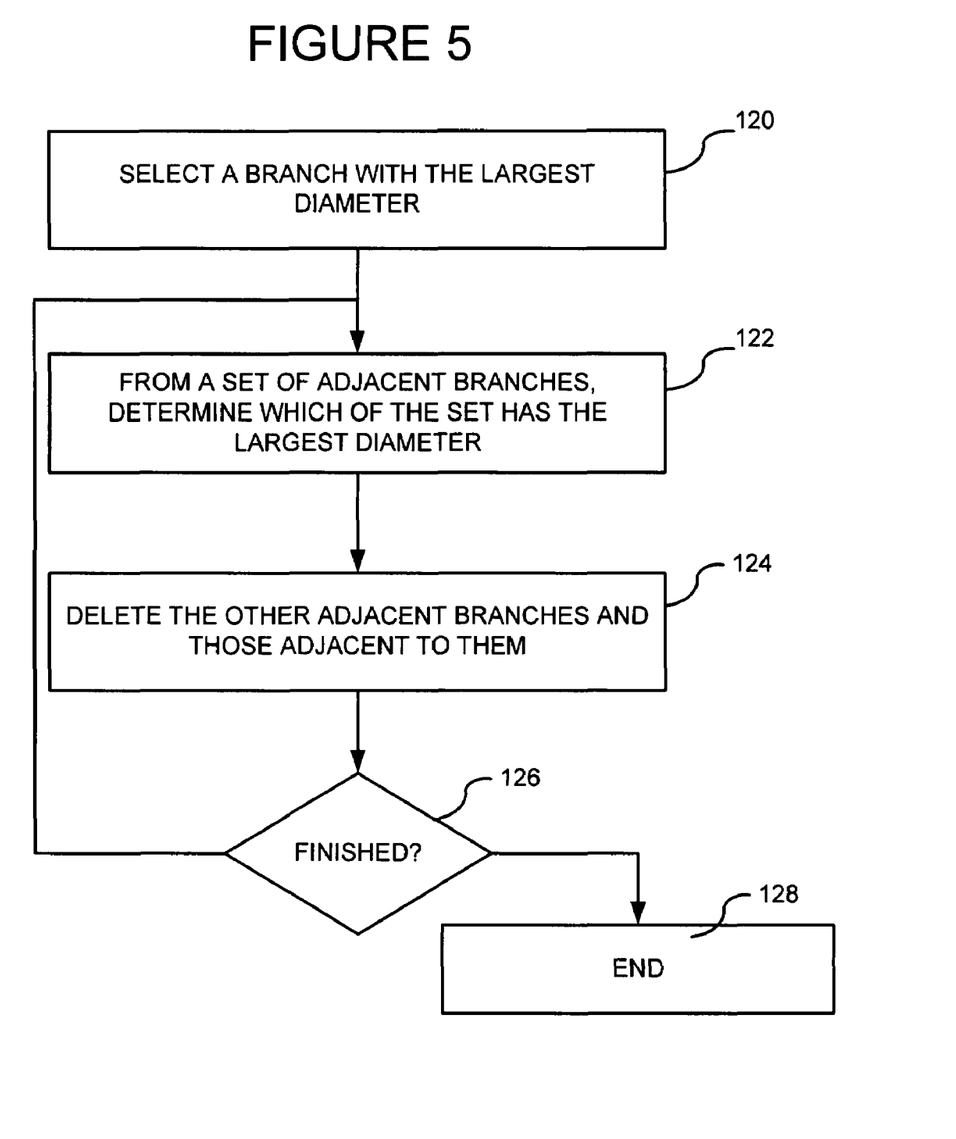
FIG. 5 is another flowchart of a method for finding a backbone of a wire harness.

FIG. 5 shows another method for determining a backbone of a wire harness. In process block 120, a branch is selected with the largest diameter in the wire harness. In process block 122, opposing end nodes of the largest branch are separately analyzed to determine which are the largest branches coupled to each end node. All other branches are deleted (process block 124). In decision block 126, an analysis is done to see if every node in the wire harness has been considered. If yes, then the method ends at 128. If not, then each of the non-deleted branches is analyzed in the same way as the largest branch.

Figure 6:
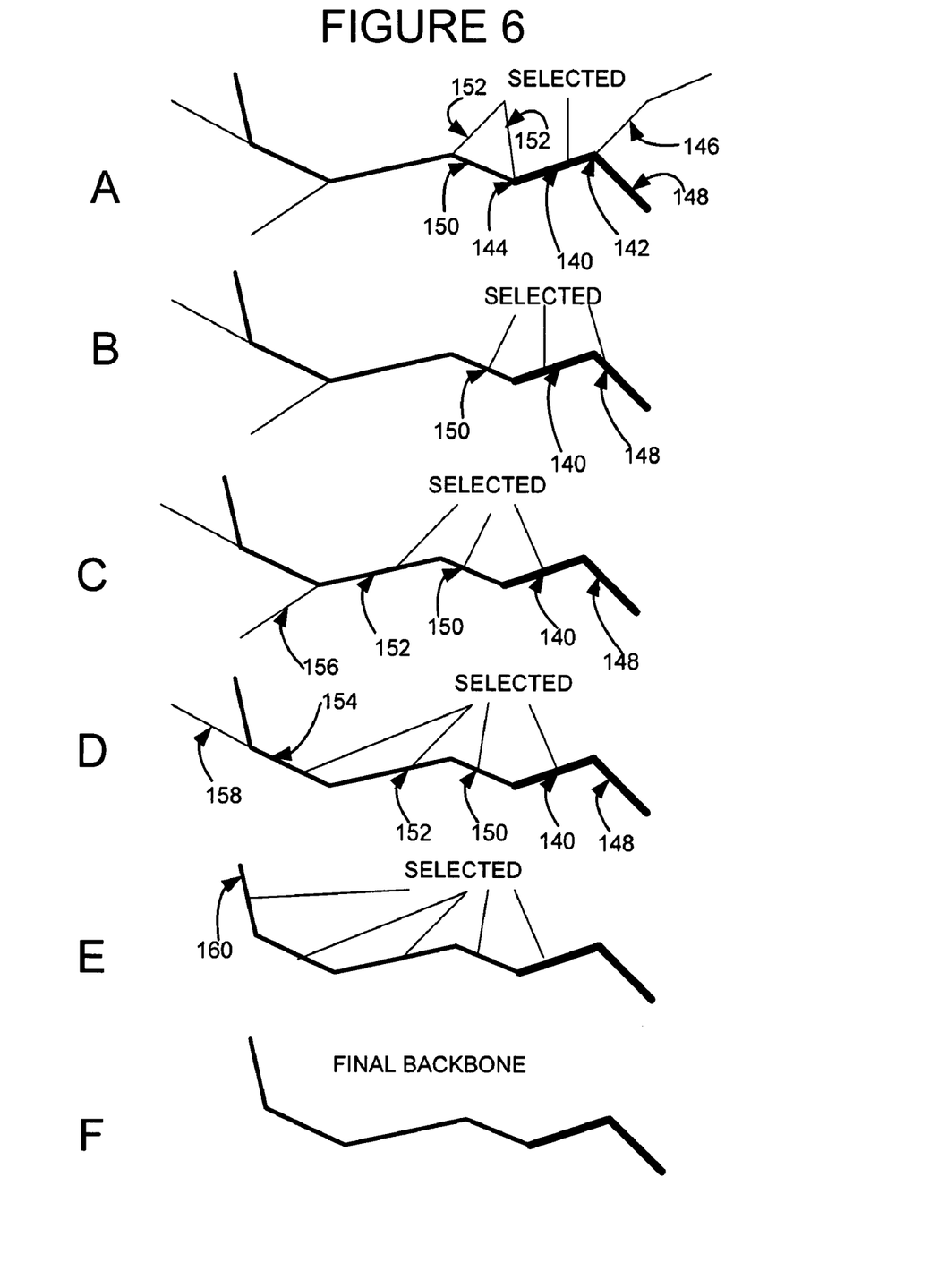
FIG. 6 is a particular example showing how the backbone is determined using the method of FIG. 5.

FIG. 6 shows a progression of selecting a backbone of a wire harness according to the method of FIG. 5. Corresponding to process block 120 in FIG. 5, the branch with the largest diameter is selected first as shown at 140. Branch 140 has two opposing nodes 142 and 144. Starting with node 142, there are two branches 146 and 148 extending there from. Branch 148 is determined to be of a larger diameter so branch 146 and any branches connected thereto are deleted. As for node 144, branch 150 is determined to have the largest diameter and branches 152 and 154 are deleted. The result is shown at "B" with branches 140, 148 and 150 selected. Branch 148 is an end branch, so no further analysis is needed on the right side of the wire harness. On the left side, there is only one branch 152, so it is selected as having the largest diameter as shown at "C". As shown at "D", branch 154 is selected and 156 is deleted. Finally, at "E", branch 160 is selected and branch 158 is deleted. The final backbone is shown at "F".

Figure 7A:
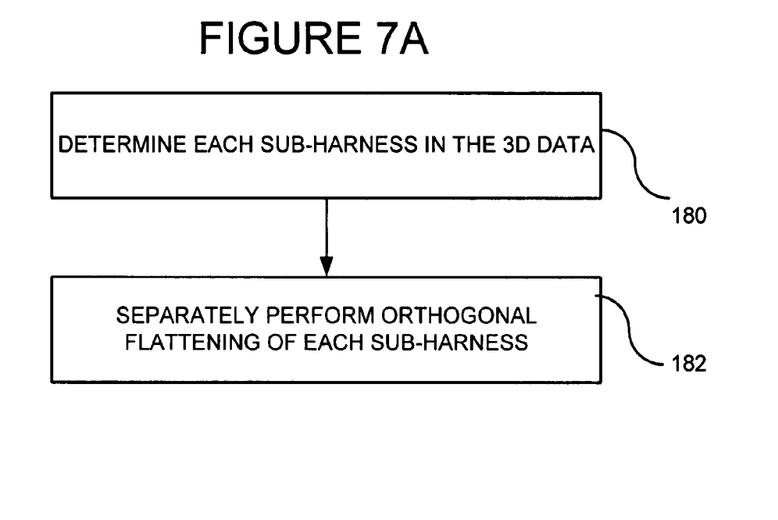
FIGS. 7A-7C are flowcharts of a method for generating the orthogonal view.
Figure 7B:
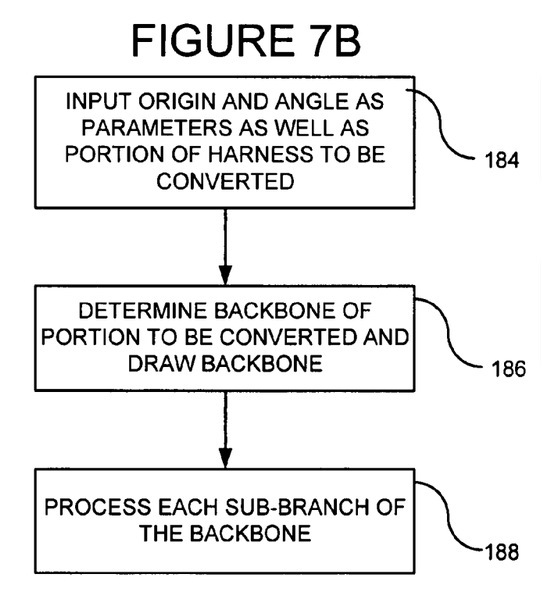

FIGS. 7A-7C shows a method for automatic generation the orthogonal view of the wire harness in two dimensions. Starting with FIG. 7A, a determination is made if there is more than one harness in the three-dimensional representation (process block 180). Generally, the three-dimensional data includes just one wire harness, but if there are electrical disconnects in the harness, the system treats each electrically isolated part of the harness as a separate sub-harness. Thus, a first check is made by simply going through the nodes in the wire harness to see that they are all connected. If not, each sub-harness is taken in turn and converted to an orthogonal view separately (process block 182). If there is just one wire harness without disconnects, then the entire wire harness is converted to an orthogonal view. Process block 182 performs a call to an object or procedure shown in FIG. 7B.

Figure 7C:
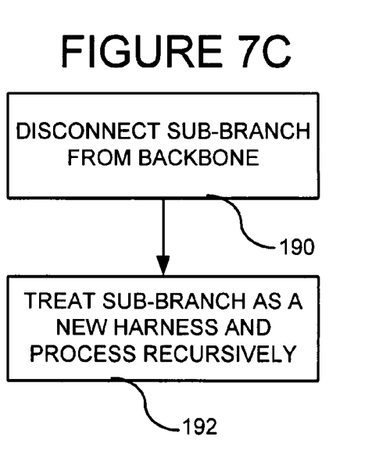

FIG. 7B shows at process block 184, parameters are received relating to angle and origin. It is helpful to look at an example in FIG. 8 during the explanation of FIG. 7. FIG. 8 shows a wire harness 198 after it is fully drawn. The first part drawn is the backbone, which is the horizontal line 200 starting at origin 202, which includes multiple segments defined by nodes 204, 206, 208, 210, 212, and 214. In this particular example, the backbone is drawn at an angle of "0". Thus, returning to process block 184 of FIG. 7B, the angle is "0" and origin is the coordinates identified at 202. In process block 186, the backbone 200 is determined using the techniques described in FIGS. 3-6. Then the backbone is drawn as a straight line as shown in FIG. 8, with the nodes 204, 206, 208, 210, 212, and 214 in their appropriate location. At process block 188, each sub-branch (sub-branch) connected to the backbone is processed so that it can be represented in the two-dimensional orthogonal view.

For example, returning to FIG. 8, the first sub-branch is located at node 204, which has two takeouts (herein after called sub-branches) 220, 222. In process block 188 of FIG. 7B, sub-branch 220 is processed first by calling the object or process of FIG. 7C. In process block 190, the sub-branch 220 is disconnected from the backbone 200. In process block 192, the sub-branch 220 is treated like a backbone and the object or process in FIG. 7B is called recursively. The angle used is "90" degrees and the origin is node 204. The result is that the sub-branch 220 is drawn vertically upward. There are no sub-sub-branches connected to sub-branch 220, but if there were, they would be handled the same way with an angle of 90 degrees added at each level of recursion. An example of such a sub-sub-branch is shown at 230, which is at an angle of 180 degrees. In any event, the recursive routines of FIG. 7 continue in the described way in order to draw the wire harness of FIG. 8. It should also be noted that when there are more than four sub-branches entering a node, one of the sub-branches is drawn at an angle less than 90 degrees, such as shown at 232. The exact angle used is an input to the algorithm.

Figure 9:
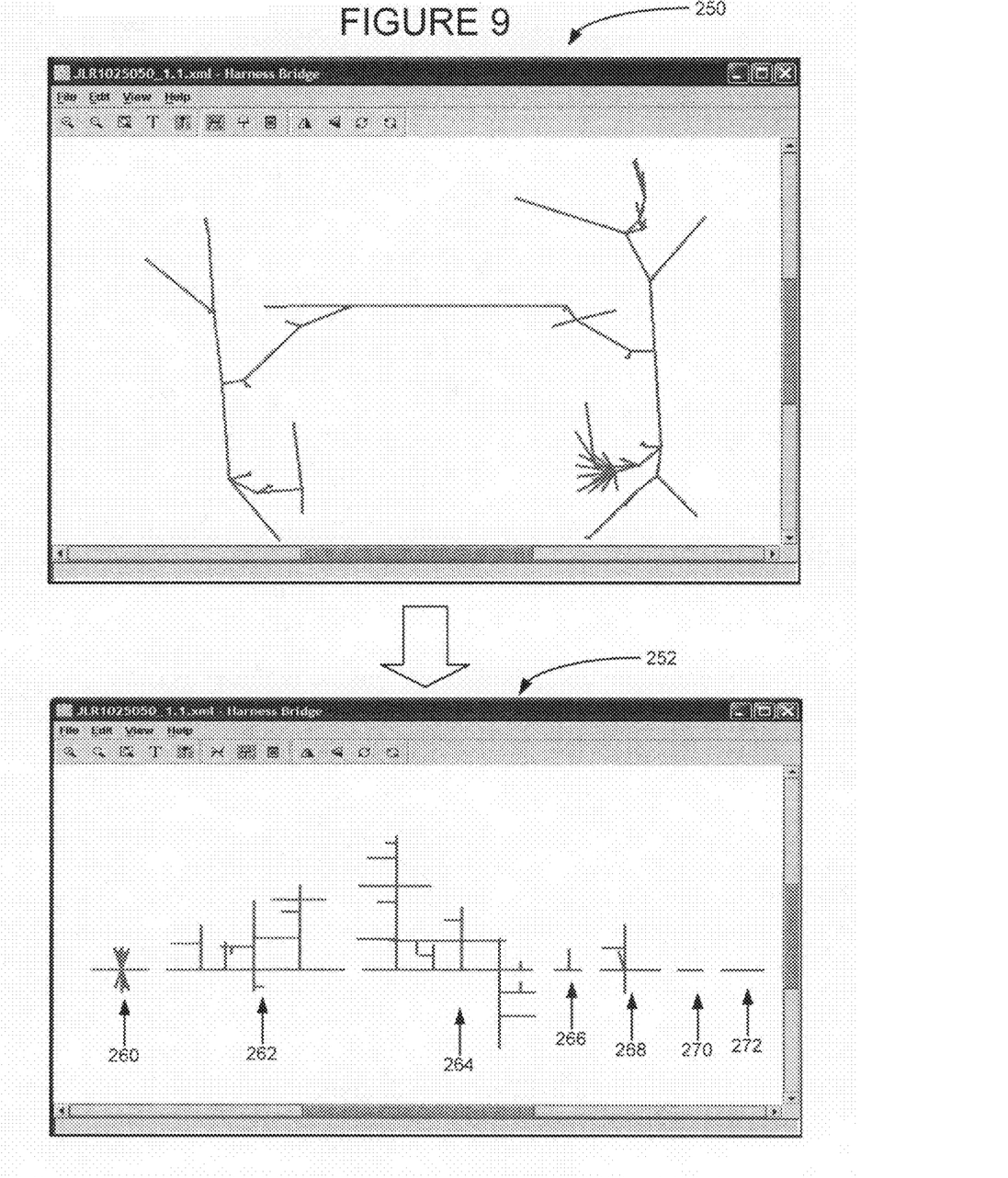
FIG. 9 is an example conversion from a wire harness represented using three-dimensional data to an orthogonal view of the wire harness.

FIG. 9 shows an example of a wire harness as a three-dimensional representation (even though displayed on a 2D monitor) at 250. An orthogonal, topology-based representation is shown at 252 and is a view generated by converting the 3D view 250. In this example, there are multiple disconnects in the harness shown at 250, although such disconnects are impossible to see due to node overlap and branch overlap.

However, in the orthogonal view 252, the disconnects are readily visible. The disconnects generate sub-harnesses 260, 262, 264, 266, 268, 270, and 272. Each sub-harness is separately processed in order to generate the orthogonal view shown at 252.

Figure 10:
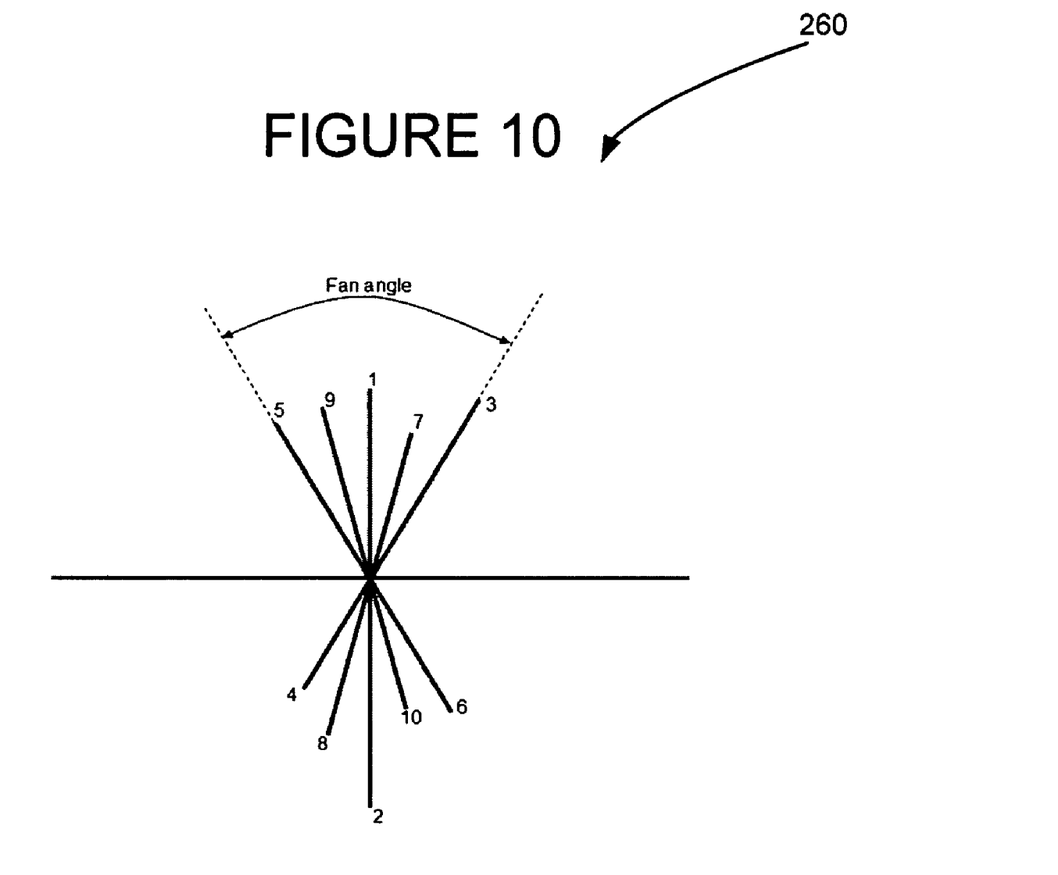
FIG. 10 shows an example of fan-out.

The sub-harness at 260 is an example of fan-out and is shown in more detail in FIG. 10. Fan-out occurs when there are multiple branches (more than 4) entering a single node. Each branch after the fourth cannot be drawn perpendicularly because it will overlap with other branches and be non-visible. Thus, the branches are represented at various angles within a fan angle which is an angle of less than 90 degrees provided as an input. The number shown on the sub-branches corresponds to the order they are represented. Longer branches are generally placed on the perimeter of the fan-out and in the center to increase visibility.

Figure 11:
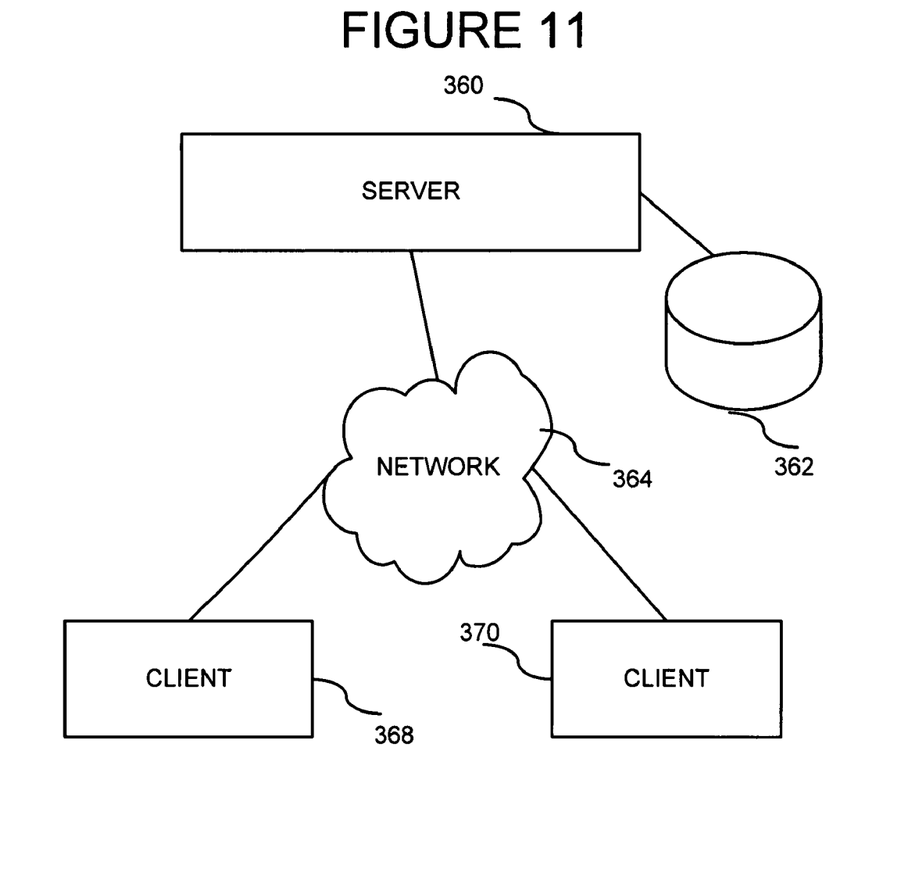
FIG. 11 is a system view of a network that may be used in conjunction with the system and method.

FIG. 11 shows that portions of the system may be applied to a distributed network, such as the Internet. For example, a server computer 360 may have an associated database 362 (internal or external to the server computer). The server computer is coupled to a network shown generally at 364. One or more client computers, such as those shown at 368 and 370, are coupled to the network to interface with the server computer using a network protocol.

Figure 12:
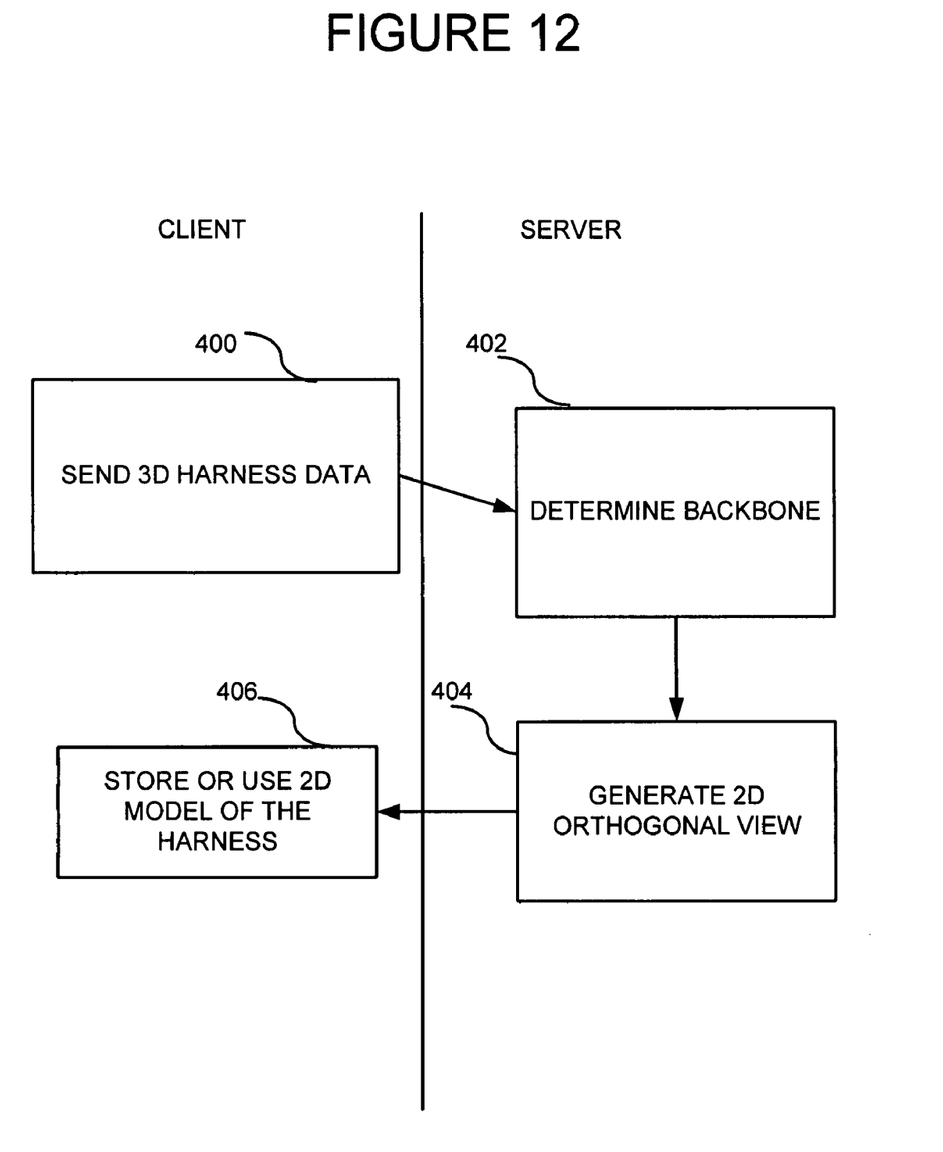
FIG. 12 shows the method being applied on the network of FIG. 11.

FIG. 12 shows a flow diagram using the method on the network of FIG. 11. In process block 400, the 3D wire harness data is sent from a client computer, such as 368, to the server computer 360. In process block 402, the backbone is determined using any desired method. In process block 404, the 2D orthogonal view is generated on the server computer. In process block 406, the results are used or displayed to the user on the client computer.

Having illustrated and described the principles of the illustrated embodiments, it will be apparent to those skilled in the art that the embodiments can be modified in arrangement and detail without departing from such principles.

For example, it is readily apparent that the orthogonal view does not require every branch and every sub-branch to be perpendicular. Indeed, a typical orthogonal view has more than 75% of the lines orthogonal, while others are at angles, such as when a fan-out is implemented.

Additionally, it should be recognized that the orthogonal view is a topology-based view and is not necessarily to scale.

Still further, the wire harness disconnects found in the orthogonal view may be highlighted and when switching back to the 3D view, the area of disconnection may remain highlighted and thus provide immediate visual feedback as to the 3D location of the missing connections. If the MCAD tool provides a network connected mode, the branches can be highlighted in the MCAD tool allowing the designer to quickly fix the master 3D data.

Further, although the backbone is found first before generating the orthogonal view, those skilled in the art recognize that other starting points are possible and thus the backbone need not be determined in certain applications.

In view of the many possible embodiments, it will be recognized that the illustrated embodiments include only examples of the invention and should not be taken as a limitation on the scope of the invention. Rather, the invention is defined by the following claims. We therefore claim as the invention all such embodiments that come within the scope of these claims.

We claim:

1. A method to convert a three-dimensional representation of a wire harness to a two-dimensional representation, comprising:

receiving the three-dimensional representation of the wire harness including multiple branches; and automatically detecting electrical disconnects in the wire harness by detecting at least one sub-harness that is electrically disconnected from the wire harness;

in a computer, automatically converting the three-dimensional representation to a two-dimensional representation with the branches arranged perpendicularly so that the branches are easier to visualize;

wherein automatically converting includes:

determining a first backbone of the wire harness and representing the first backbone as a straight line having a first angle;

changing angles associated with branches coupled to the first backbone to 90 degrees relative to the first angle of the first backbone;

determining a first backbone of at least one of the branches coupled to the first backbone and changing an angle of a sub-branch coupled to the at least one branch to 90 degrees relative to the at least one branch;

determining a second backbone for the detected at least one sub-harness that is electrically disconnected from the first backbone and representing the second backbone as separate from the first backbone.

2. The method of claim 1, furthering including automatically generating a fan-out when more than four branches enter a node of the wire harness, such that a branch extends from the node at a non-perpendicular angle while other branches extend from the node at a perpendicular angle.

3. The method of claim 2, further including determining how the fan out angle is partitioned to allocate an angle to each branch.

4. The method of claim 2, further including placing branches of longer length on a perimeter of the fan-out.

5. The method of claim 1, further including determining multiple sub-harnesses in the wire harness and treating each sub-harness as a separate wire harness including determining a separate backbone for each sub-harness.

6. The method of claim 1, wherein receiving the three-dimensional data is from a Mechanical Computer Aided Design system and wherein the converting is performed in an Electrical Computer Aided Design system.

7. The method of claim 1, wherein the multiple branches includes a main backbone and multiple sub-branches coupled to the main backbone, and the method further includes determining which branches form the main backbone.

8. The method of claim 7, wherein determining the main backbone includes determining which branches have the largest number of wires or wherein determining the main backbone includes determining which branches have the largest number of sub-branches.

9. The method of claim 7, wherein determining the main backbone includes:

a) assigning a degree to each node based on the number of branches coupled to that node;

b) decrementing all degrees that are assigned a "1" to a "0";

c) removing any branches with a node having a degree of "0";

d) decrementing all nodes based on the number of branches removed from the node; and e) re-performing (a)-(d) if or until the number of nodes with degree "1" equals two.

10. The method of claim 7, wherein determining the main backbone includes:

a) selecting a branch with the largest diameter as a starting point;

b) determining a set of sub-branches coupled to the selected branch;

c) from the set of sub-branches, determining which has the largest diameter and deleting the rest; and d) re-perform (a)-(c) until each branch in the wire harness has been analyzed.

11. The method of claim 1, wherein part of the method is performed on a server computer and part of the method is performed on a client computer communicating with the server computer over a network.

12. A computer-readable medium including instructions stored thereon for performing the following method:

receiving the three-dimensional representation of the wire harness including multiple branches;

automatically detecting electrical disconnects in the wire harness by detecting sub-harnesses that are electrically disconnected from the wire harness and processing the sub-harnesses separately;

in a computer, automatically converting the three-dimensional representation to a two-dimensional representation with the branches arranged perpendicularly so that the branches are easier to visualize;

wherein automatically converting includes:

determining a first backbone of the wire harness and representing the first backbone as a straight line having a first angle;

changing angles associated with branches coupled to the first backbone to 90 degrees relative to the first angle of the first backbone;

determining a first backbone of at least one of the branches coupled to the first backbone and changing an angle of a sub-branch coupled to the at least one branch to 90 degrees relative to the at least one branch;

determining a second backbone for a detected sub-harness that is electrically disconnected from the first backbone and representing the second backbone as separate from the first backbone.

13. A method to convert a three-dimensional representation of a wire harness to a two-dimensional representation, comprising:

receiving the three-dimensional representation of the wire harness including multiple branches;

in a computer, automatically converting the three-dimensional representation to a two-dimensional representation with the branches arranged perpendicularly so that the branches are easier to visualize;

wherein automatically converting includes:

determining a backbone of the wire harness and representing the backbone as a straight line having a first angle;

changing angles associated with branches coupled to the backbone to 90 degrees with respect to the first angle of the backbone;

wherein determining the backbone includes:

a) selecting a branch with the largest diameter as a starting point;

b) determining a set of sub-branches coupled to the selected branch;

c) from the set of sub-branches, determining which has the largest diameter and deleting the rest; and d) re-perform (a)-(c) until each branch in the wire harness has been analyzed.

14. The method of claim 13, further including automatically detecting electrical disconnects in the wire harness.

15. The method of claim 13, furthering including automatically generating a fan-out when more than four branches enter a node of the wire harness, such that a branch extends from the node at a non-perpendicular angle.

16. The method of claim 15, further including determining how a fan out angle is partitioned to allocate an angle to each branch.

17. The method of claim 15, further including placing branches of longer length on a perimeter of the fan-out.

18. The method of claim 13, further including determining multiple sub-harnesses in the wire harness and treating each sub-harness as a separate wire harness including determining a separate backbone for each sub-harness.

19. The method of claim 13, wherein receiving the three-dimensional data is from a Mechanical Computer Aided Design system and wherein the converting is performed in an Electrical Computer Aided Design system.

20. A method to convert a three-dimensional representation of a wire harness to a two-dimensional representation, comprising:

receiving the three-dimensional representation of the wire harness including multiple branches; and in a computer, automatically converting the three-dimensional representation to a two-dimensional representation with the branches arranged perpendicularly so that the branches are easier to visualize;

wherein automatically converting includes:

determining a backbone of the wire harness and representing the backbone as a straight line having a first angle;

changing angles associated with branches coupled to the backbone to 90 degrees with respect to the first angle of the backbone;

wherein determining the backbone includes:

a) assigning a degree to each node based on the number of branches coupled to that node;

b) decrementing all degrees that are assigned a "1" to a "0";

c) removing any branches with a node having a degree of "0";

d) decrementing all nodes based on the number of branches removed from the node; and e) re-performing (a)-(d) if or until the number of nodes with degree "1" equals two.

* * * * *

UNITED STATES PATENT AND TRADEMARK OFFICE
CERTIFICATE OF CORRECTION

| | | |
|---|---|---|
| PATENT NO. | : 7,725,846 B2 | Page 1 of 1 |
| APPLICATION NO. | : 11/818110 | |
| DATED | : May 25, 2010 | |
| INVENTOR(S) | : Jean-Mark Yvon et al. | |

It is certified that error appears in the above-identified patent and that said Letters Patent is hereby corrected as shown below:

In the Claims:

Column 6, line 25, "furthering including" should read --further including--.

Column 6, line 44, "includes a main" should read --include a main--.

Column 7, line 5, "re-perform" should read --re-performing--.

Column 8, line 7, "re-perform" should read --re-performing--.

Column 8, line 11, "furthering including" should read --further including--.

Signed and Sealed this
Eleventh Day of January, 2011

David J. Kappos
*Director of the United States Patent and Trademark Office*